March 1, 1960  W. A. REEVES ET AL  2,927,050
FLAMEPROOFING OF WOOD
Filed Sept. 3, 1953
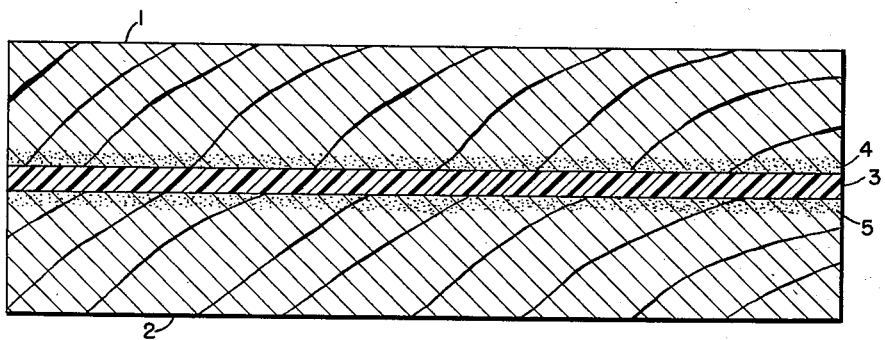
INVENTORS
WILSON A. REEVES
JOHN D. GUTHRIE
BY
ATTORNEYS United States Patent Office 2,927,050
Patented Mar. 1, 1960

2,927,050

FLAMEPROOFING OF WOOD

Wilson A. Reeves and John D. Guthrie,
New Orleans, La.

Application September 3, 1953, Serial No. 378,435

2 Claims. (Cl. 154—133)

(Granted under Title 35, U.S. Code (1952), sec. 266)

A non-exclusive, irrevocable, royalty-free license in the invention herein described, throughout the world, for all purposes of the United States Government, with the power to grant sublicenses for such purposes, is hereby granted to the Government of the United States of America.

This invention relates to new processes of flameproofing wood and producing flame resistant wood compositions using phosphorus and nitrogen containing polymers.

This application is a continuation in part of our copending applications, Serial Nos. 283,743, filed April 22, 1952, now Patent No. 2,668,096, and 283,744, filed April 22, 1952, now abandoned.

The polymers used in the process of this invention are cross linked polymers containing reoccurring structural units that are composed of phosphorus atoms, which are members of pentavalent phosphorus radicals of the group trimethylene phosphine oxide and tetramethylene phosphonium chloride radicals, and which are linked to trivalent nitrogen atoms by connecting structures of the group $CH_2OCH_2$ and $CH_2$.

The polymers are produced by reacting phosphorus compounds of the group tris(hydroxymethyl) phosphine oxide and tetrakis(hydroxymethyl) phosphonium chloride and mixtures thereof with monomeric organic compounds containing at least two members of the group, hydrogen and $CH_2OH$, attached to trivalent nitrogen atoms.

Our copending application Serial No. 378,437, filed of even date, now Patent No. 2,809,941, relates to the polymers, their production and certain of their uses.

The compounds, tetrakis(hydroxymethyl) phosphonium chloride and tris(hydroxymethyl) phosphine oxide are hereinafter referred to by their initials THPC and THPO respectively. The term "phosphorus compounds" is employed to refer to THPC or THPO or mixtures of THPC and THPO. The term nitrogen compounds is employed to refer to monomeric organic compounds containing at least two members of the group, hydrogen and $CH_2OH$, attached to trivalent nitrogen atoms. The term "THPC-resin" is employed to refer to resins produced by reacting the phosphorus compounds with the nitrogen compounds. The term "wood compositions" is employed to refer to compositions of the group, wood and composite woods composed of glued together segments of wood.

Wood and wood compositions present a flameproofing problem which is materially different from that presented by fibrous hydrophilic organic materials. In the latter type materials, substantially independent fibers are tangled together, leaving interstices, capable of being filled by an aqueous medium by capillary action, between all of their surfaces. The individual fibers contain a relatively small amount of cellulose, and the materials, composed of them have a relatively low ignition temperature. In wood and wood compositions, the cellulosic fibers are bonded together to form a relatively impenetrable block susceptible to little capillary action. A piece of wood has small surface area in relation to the amount of surface area it contains and has a relatively high ignition temperature. A flameproofing agent which flameproofs fibrous hydrophilic organic materials is not likely to flameproof wood because its capacity to inhibit burning is likely to be destroyed by the time it is heated to the ignition temperature of wood; and/or because of the difficulty of causing a nonvolatile substance to penetrate into the volume of a block of wood. Most flameproofing agents merely form a surface coating on wood, and thus provide no flameproofing in areas from which the coating is chipped or peeled.

An object of the present invention is to provide a process of flameproofing wood and wood compositions by impregnating the wood with a flameproofing agent which penetrates to a depth sufficient to reduce the flammability of the wood. Another object is to provide a process of gluing together segments of wood, such as small fragments or relatively thin layers of wood, to produce a flame resistant wood composition. Another object is to provide a process of forming a THPC-resin inside of the wood contained in wood compositions, to produce an impregnated wood of enhanced structural strength which is resistant to decay, termites, acids and burning.

In general the process of the present invention comprises: impregnating the surface and at least a portion of the volume of a piece of wood with an incompletely polymerized THPC-resin and subjecting the so impregnated piece of wood to conditions under which the polymerization of said resin is completed in situ.

Preferred THPC-resins are made by condensing the phosphorus compounds with nitrogen compounds of the group urea, melamine, guanidine, and alkenoyl amides, such as acrylamide, and water-soluble methylolated and alkylated methylolated derivatives thereof.

A catalyst is not needed when THPC or mixtures of THPC and THPO in which THPC is the major phosphorus containing component is reacted with amine compounds, but when THPO is used alone, or used as the major phosphorus containing component, an acidic or basic catalyst may advantageously be used. Preferred acid reacting catalysts are acetic acid, hydrochloric acid and the acid catalysts conventionally used in the production of amine resins; preferred basic reacting catalysts are alkali metal carbonates and bicarbonates, triethanolamine, and diethanolamine.

THPC and THPO or mixtures of these compound polymerize with the nitrogen compounds to form: first, water soluble resinoids, A-stage resins; second, larger molecular weight materials which are practically insoluble, B-stage resins; and third, are converted to highly cross linked, water insoluble, clear resins, C-stage resins. The insolubilization can be accomplished by allowing the resinoids to cure for several days at room temperature, but preferably is accomplished by curing at an elevated temperature for a short time. The A-stage and B-stage resins can be obtained by heating an aqueous solution of the phosphorus compounds and nitrogen compounds until the desired degree of polymerization is obtained. These polymeric materials are flameproof and glowproof, and impart to segments of wood with which they are in contact, a considerable capacity to resist burning when at relatively high temperatures in the presence of open flames.

The THPC-resins can be used in combination with other surface coatings or glues. For example, the THPC-resins can be used to impart strength and flame and glow resistance, to a piece of wood to be coated with a surface coating or bonded by a glue.

Solutions of incompletely polymerized THPC-resins can be caused to penetrate into the cell-wall structure of the wood. The polymers with which the so treated wood is impregnated can be insolubilized in situ by heating. The resin impregnated wood so formed is nonhydroscopic, resists decay, termites, and acids, and is very hard, and is flameproof and glowproof. Wood impregnated with either A-stage or B-stage resins may be used for "impreg" wood, uncompressed wood, or "compreg" wood, wood subjected to heat and pressure. Impregnated veneers can be dried and heated until the resinoids have polymerized to the B-stage then the veneers can be put together by application of heat and pressure without any additional adhesive to form flameproof plywood.

In the production of flameproof plywoods in which THPC-resins constitutes the adhesive that bonds the pieces as well as flameproofing agent, the resins produced by reacting the phosphorus compounds with urea or with acrylamide are preferred. These resins can be introduced into the assembly as A-stage or B-stage molecules and polymerized to the C-stage in situ. Joints are readily attained that have great strength. These resins are not readily attacked by microorganisms, nor are they affected by acids and alkali, and they are resistant to humid temperatures. These THPC-resins when used as wood adhesives may contain other ingredients as extenders or fillers.

As an illustration of the use of the resins as adhesives, reference is made to the accompanying drawing in which the single figure represents a laminated product made of two pieces of wood cemented together with the THPC-resin. In the drawing, 1 and 2 represent the two layers of wood which are cemented together by the body of resin 3, portions 4 and 5 of which have penetrated into the surfaces of the wood and were cured in situ.

Resinoids of the THPC-resins are not soluble in organic surface-coating solvents since they are highly hydrophilic.

Example 1

Aqueous solutions of THPC dissolved in water and neutralized to pH of about 6.8 with triethanolamine were added to aqueous solutions containing trimethylolmelamine and urea. These final solutions were applied to various types of wood by various methods and cured by heating. These woods were all flameproof and glowproof and remained flameproof and glowproof after they had been submerged in hot running water for several hours and dried in an oven.

The solutions were applied to these woods by one of the following methods: (1) by submerging or soaking the wood in the solution for about 16 hours, (2) by brushing the solution on the wood, and (3) by reducing the pressure for about 12 hours in a vessel which contained the wood submerged in the solution then releasing the vacuum and allowing the wood to remain in the solution for an additional two hours.

In order to determine if the woods were flameproof and glowproof, they were held in the flame of a Bunsen burner for two minutes and if the wood did not support a flame nor glow when removed from the Bunsen burner, it was considered flameproof and glowproof. The conditions of the experiments and the results of the tests are given in the table below. The flameproofing resins penetrated the pine and fir woods to a considerable depth when applied by the vacuum method. Samples of the wood taken from about 5 mm. beneath the surface would not burn when held in an open flame.

TABLE I

| Sample No. | Type of wood treated | Solution concentration | | | Method of applying solution to wood | Method of cure | Flamming and glowing properties of treated wood (one min. over Bunsen burner) |
| --- | --- | --- | --- | --- | --- | --- | --- |
| | | THPC, percent | Urea, percent | Trimethylolmelamine, percent | | | |
| 1 | Pine | 19 | 9 | 11.5 | Vacuum | Heat 30 min., 120° C | Flameproof and glowproof. |
| 2 | do | 19 | 9 | 11.5 | do | do | Do. |
| 3 | Cypress | 19 | 9 | 11.5 | do | do | Do. |
| 4 | do | 10.5 | 5 | 6.4 | do | do | Do. |
| 5 | Pine | 10.5 | 5 | 6.4 | do | do | Do. |
| 6 | Oak | 10.5 | 5 | 6.4 | do | do | Do. |
| 7 | Fir plywood | 10.5 | 5 | 6.4 | do | do | Do. |
| 8 | Cypress | 10.5 | 5 | 6.4 | Soak | do | Do. |
| 9 | Pine | 10.5 | 5 | 6.4 | do | do | Do. |
| 10 | Oak | 10.5 | 5 | 6.4 | do | do | Do. |
| 11 | Fir plywood | 10.5 | 5 | 6.4 | do | do | Do. |
| 12 | Pine | 10.5 | 5 | 6.4 | Brushed | do | Do. |

By condensing these resinoids with butanol or higher aliphatic alcohols, alkoxy groups are attached to the resinoids and the so modified resinoids are soluble in surface-coating solvents. Mixtures of these alcohol soluble THPC-resinoids with compatible polyester resins constitute enamels which have a combination of properties of both the alkyd and the THPC-resins. In such mixtures the alkyd resins act as plasticizer for the THPC-resins and the THPC-resins act as hardeners for the alkyd resins. These mixtures form surface coatings which are hard, tough, and durable; and which are suitable for many uses. Such surface coatings are preferably hardened by baking. The baking can conveniently be done with infrared heat. Such surface coatings may be used on wood, metal, and other surfaces, and exhibit a marked resistance to burning and to heat in general. The preparation of surface coating solutions from these THPC-resins and alkyd-resins may be carried out in much the same way as used to make surface coating solutions from urea and melamine formaldehyde resins and alkyd-resins except that THPC, THPO or mixtures of THPC and THPO are used either instead of or in addition to the formaldehyde.

The terms "parts" and "percent" as used herein refer to parts or percent by weight.

Example 2

An aqueous solution of THPC (35 parts THPC and 10 parts of water) was made to pH of about 5 with a concentrated aqueous solution of sodium carbonate and then added to an aqueous solution of trimethylolmelamine and urea (20 parts of trimethylolmelamine, 12 parts of urea, and 23 parts of water). This viscous solution was brushed on a piece of pine wood. After 4 days at room temperature the solution had formed a thin clear insoluble resin over the wood. The treated wood was flameproof and glowproof.

Example 3

A clear insoluble resin made by heating an aqueous solution containing 20 parts of THPC, 10 parts of urea and 9 parts of trimethylolmelamine was ground to a powder. 10 parts of the powder was added to 10 parts of an alkyd type paint and mixed thoroughly. The mixture was brushed on a piece of pine wood. After the paint was thoroughly dry (1 day), the wood was flameproof.

Example 4

19 parts of THPC and 14 parts of acrylamide were boiled in an aqueous solution until the material was very viscous and only slightly soluble in water. B-stage resin had formed. The B-stage resin was spread on two pieces of veneer wood then these pieces were held together under pressure and baked for 30 minutes at 150° C. When the wood had cooled to room temperature the veneers were held together with such force that the wood would break before the bond would break. The bonded veneer wood was flameproof.

We claim:

1. A flameproof plywood comprising layers of wood impregnated and bonded together with a polymer made by reacting tetrakis(hydroxymethyl) phosphonium chloride with acrylamide.

2. A process for producing a bonded and flame-resistant wood product which comprises impregnating the surfaces and at least portions of the volumes of separate relatively thin layers of wood with a solution of an incompletely polymerized cross-linked resin consisting of the reaction product of tetrakis(hydroxymethyl)phosphonium chloride and acrylamide, contacting the surface of one of said thin layers of impregnated wood with the surface of another of said thin layers of impregnated wood, and completing the polymerization and insolubilization of the resin in and between the layers of wood by subjecting them to a temperature of about from 30° to 150° C.

References Cited in the file of this patent

UNITED STATES PATENTS

| | | |
|---|---|---|
| 2,262,634 | Cobbs | Nov. 11, 1941 |
| 2,636,876 | Zenftman et al. | Apr. 28, 1953 |
| 2,668,096 | Reeves et al. | Feb. 2, 1954 |